Feb. 28, 1961 E. MEZGER 2,973,106
APPARATUS FOR LIFTING AND SETTING DOWN OF MOULDING BOXES
Filed Aug. 22, 1957 3 Sheets-Sheet 1

INVENTOR:
Eduard Mezger
BY: Michael S. Striker
ATTORNEY

Feb. 28, 1961 E. MEZGER 2,973,106
APPARATUS FOR LIFTING AND SETTING DOWN OF MOULDING BOXES
Filed Aug. 22, 1957 3 Sheets-Sheet 2

INVENTOR:
Eduard Mezger
BY: Michael S. Striker
ATTORNEY

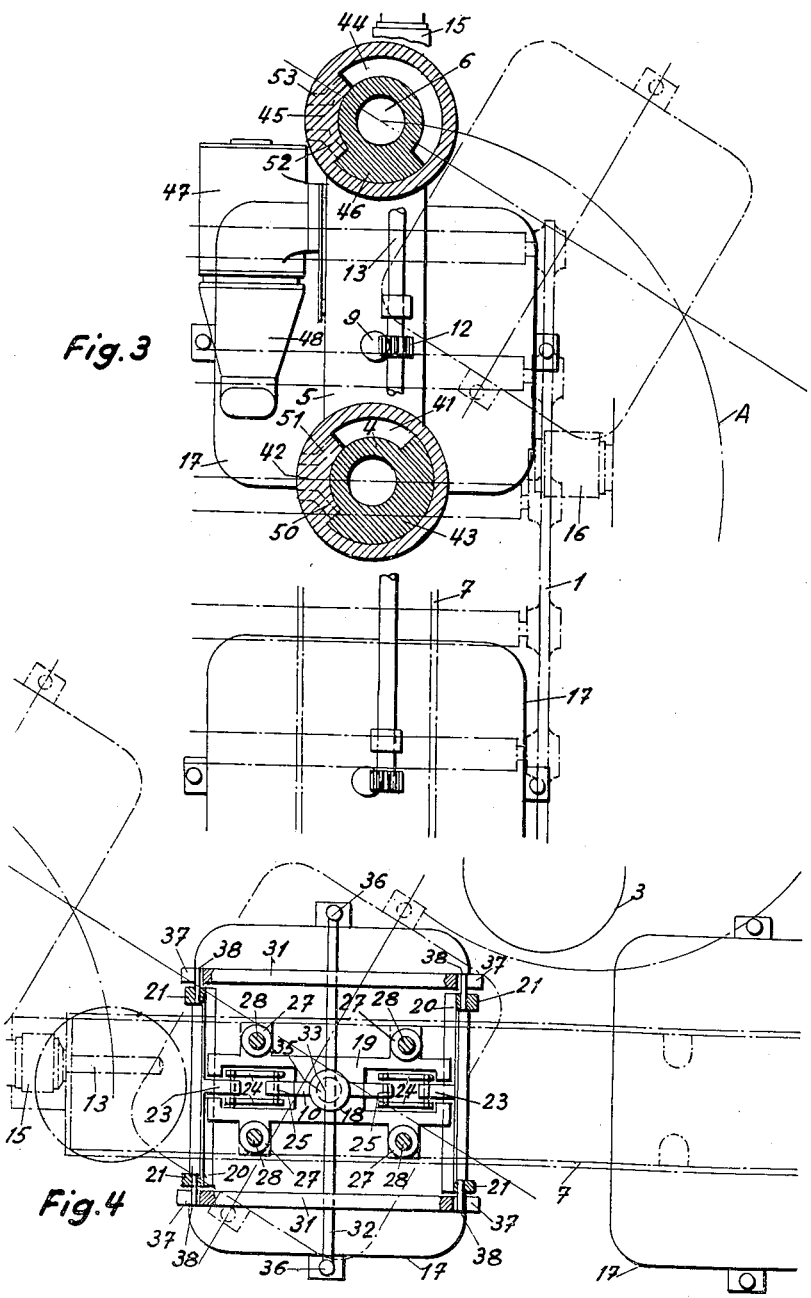

United States Patent Office 2,973,106
Patented Feb. 28, 1961

2,973,106

APPARATUS FOR LIFTING AND SETTING DOWN OF MOULDING BOXES

Eduard Mezger, Muhlegasse 198, Kallnach, Switzerland

Filed Aug. 22, 1957, Ser. No. 679,619

Claims priority, application Switzerland Aug. 24, 1956

11 Claims. (Cl. 214—1)

In moulding operations the setting of the empty moulding boxes on the table of the moulding machine, or on the moulding plate already mounted thereon, necessitates a considerable expenditure of time and labour. Lightweight moulding boxes are frequently set by hand on the moulding plate on the table of the moulding machine. Heavy moulding boxes must, however, be lifted and set down upon the moulding plate by means of a crane. More recently, use is being made of a variety of automatically operating moulding machines, and, in order to utilise to the full moulding machines of this type, the setting of the moulding boxes upon the table of the moulding machine or upon the moulding plate mounted thereon, must be automatic, since the setting of the moulding boxes by hand, or by means of a manually operated crane would interrupt and greatly delay the working process of the automatic machine. The moulding box has therefore to be automatically lifted from a delivery appliance, for example from a rolling table or from a caterpillar band, brought over the table of the moulding machine and, while being simultaneously centred, set down on to the moulding plate located upon the table of the moulding machine, whereupon the mechanism transferring the moulding box to the table of the moulding machine must at once be restored to its starting position above the delivery appliance. There are, however, certain difficulties here. Generally the space available is very limited, and it is necessary above all that the space in front of the moulding machine shall remain free, for the insertion of the cores, the closing of the moulding boxes and the conveying away of the moulding boxes made ready for the moulding process must not be impeded, and surfaces in the range of the cranes may not be obstructed. These difficulties are particularly great when twin moulding machines are being considered which have two tables disposed adjacent, on which moulding is undertaken simultaneously.

It is among the objects of the invention to obviate these difficulties.

According to the invention apparatus is provided for lifting moulding boxes from conveyors and for setting them down on the tables of moulding machines, including a vertical column mounted at the lower end on a swinging arm pivoted beneath the conveyors and having pivoted at the upper end an arm carrying one or more box gripping means adapted for raising and lowering the boxes relatively to the tables.

In apparatus for lifting moulding boxes from conveyor means, and for setting them down on the table of a moulding machine, there is provided under the end portion of the delivery appliance near which the moulding machine is set up, a fixedly mounted vertical axial pin or shaft on which is mounted a swinging arm, in the end of which is rotatably mounted a vertical column. At the upper end of the column a jib is fixedly mounted, on which is provided at least one vertically displaceable lifting device with an automatic grab appliance for the moulding boxes, the whole mechanism being so contrived that when the swinging arm is turned in the direction of the delivery appliance, and the jib is turned over the end of the delivery appliance, then by means of the lifting device and its grab appliance a moulding box is lifted from the delivery appliance, and by the turning of the swinging arms and the turning of the column carrying the jib in the swinging arm, the moulding box is brought over the table of the moulding machine and may be set down on a moulding plate mounted upon the table.

To serve twin moulding machines, or two adjacently disposed moulding machines, there may be provided, upon the jib, two lifting devices provided with grab appliances and jointly operated, which lifting devices are disposed at a distance from each other corresponding to the distance between the tables of the moulding machine, or to the distance between the machines.

One method of carrying the invention into effect is diagrammatically illustrated by way of example in the accompanying drawings, in which:

Figure 3 shows the left-hand portion, and Figure 4 shows, in partial section, the right-hand side of a plan view of the mechanism.

Figure 1:
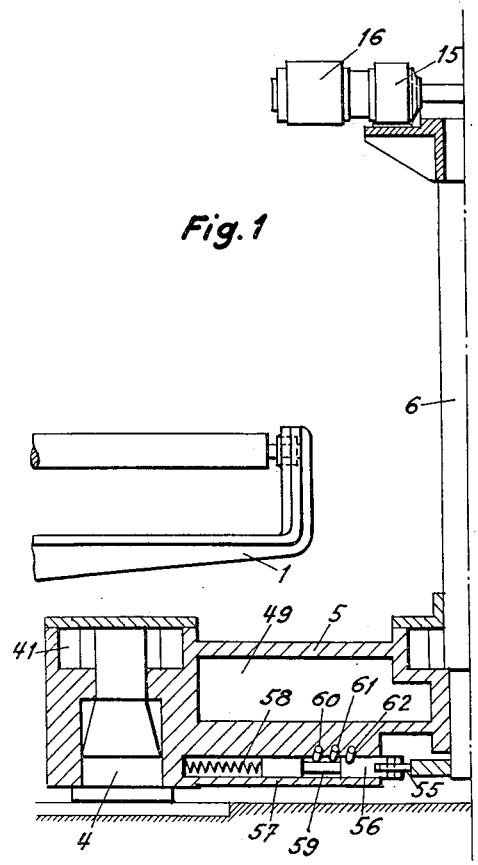
Figure 1 shows the left-hand portion.

In the drawings 1 designates the end portion of a delivery appliance, which in the example illustrated is a rolling table, on which the empty moulding boxes are delivered. Near this end portion of the delivery appliance a twin moulding machine is set up, of which only the two tables 2 are illustrated and the column 3 is shown.

Under the end portion 1 of the delivery appliance and centrally disposed in the line of the two tables 2 of the moulding machine, is fixedly mounted a vertical axial pin or shaft 4, on which one end of a swinging arm 5 is rotatably mounted. On the other end of this swinging arm 5 is mounted a vertical column 6, on the upper end of which a jib 7 is fixedly mounted. On the jib 7 two vertical guides 8 are provided, in such positions that when the swinging arm 5 is directed towards the tables 2 of the moulding machine, and the jib 7 lies in the same direction, the vertical guides are located one exactly above the centre of each of the tables 2. In each of these guides 8 a lifting rod 9 is displaceably mounted, and at the lower end of each rod a bearer member 10 is fixedly mounted. Each of these lifting rods 9 is provided with an indented bar or rack 11 with each of which a cogwheel 12 engages. These cogwheels 12 are mounted on a common shaft 13, which is mounted in bearings 14 provided on the jib 7, and is adapted to be driven, through a reduction drive 15, by a reversible electric motor 16 mounted on the jib 7. Cogwheels 12 mesh with rack bars 9 in such a manner that both rack bars are either in the position shown on the left side of Fig. 2, or in the position shown on the right side of Fig. 2.

Each of the two bearer members 10 is provided with a grab appliance which is intended automatically to seize a moulding box 17 in order to lift it, and then, after setting down this moulding box 17, to release itself automatically. These grab appliances are constructed as follows: Above the bearer member 10 is a guiding lug 18 on the lifting rod 9, on which lug a horizontal bearing plate 19 is displaceably mounted, on each of the lateral edge portions of which an axle 20 is rotatably mounted. On each of these two axles 20 two grab levers 21 are fixedly mounted and are provided at their extremities with grab claws. A lever 23 is keyed at a central position to each of the axles 20 and at the end of the lever 23 is articulated one end of a guide rod 24, the other end being mounted on an axle 25 on the bearer member 10. Four vertical cylinders 26 with pistons 27 are fixedly mounted on the bearing plate 19. Each piston 27 is mounted on the lower end of a piston rod 28 which projects above the cylinder 26 and is adjustably secured in a bearing 29 on the jib 7. The bearing plate 19, due to its own weight, tends to rest upon the bearer member 10, and when the bearing plate 19 rests upon the bearer member 10, the axles 20 are turned by the guide rod 24 and the lever 23 into a position such that the grab levers 21 fixedly mounted on them are positioned so that the grab claws 22 lying opposite each other are at the minimum distance from each other. If the lifting rod 9 is now lowered with the bearer member 10, then the bearing plate 19 follows the bearer member 10, resting upon it, until the pistons 27 come into contact with the top of the cylinder 26 and prevent a further sinking of the bearing plate 19. As the lifting rod sinks further, the bearer member 10 is separated from the bearing plate 19 and thus, by the guide rod 24, turns the lever 23 with the axles 20 in such manner that the grab levers 21 lying opposite each other are swung apart, that is to say, the grab appliance is opened. If now the lifting rod 9 with the bearer member 10 is again raised, the bearing plate, under the influence of its own weight, first remains in its lowest position, and the upward movement of the bearer member 10 through the guide rod 24, the levers 23 and the axles 20 results in the grab levers 21 being swung in the opposite direction, that is to say, the grab appliance is closed and the grab claws 22 seize the moulding box 17 located between them, which is now carried along in the further upward movement of the bearer member 10. When the moulding box 17 is lowered, the grab appliance is again opened, but not until the moulding box 17 is supported.

Figure 2:
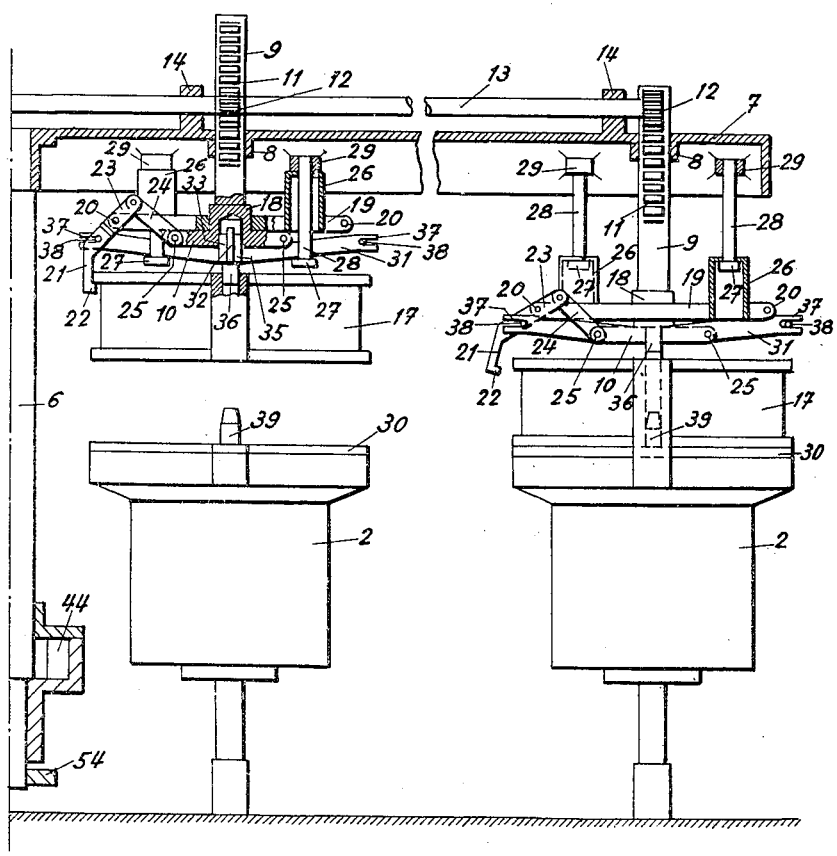
Figure 2 shows in partial section the right-hand portion of an elevation of a mechanism in two different operational positions for setting moulding boxes taken from a conveyor down upon the tables of a twin moulding machine.

In Figure 2, one grab appliance is illustrated in the closed position, whilst the other grab appliance is shown in the open position after completing the setting down of the moulding box 17. In use, however, both grab appliances are operated together by the simultaneous raising and lowering of the lifting rods 9 with the bearer members 10 and simultaneously assume either raised positions, as shown the left side of Fig. 2, or lowered positions, as shown on the right side of Fig. 2.

Each of these grab appliances is provided with a centring device, by means of which it is ensured that the moulding box 17 is set down in exactly the correct position on the moulding plates 30 located on the tables 2 of the moulding machine. This centring device is constructed as follows: Both in front of and behind the bearing plate 19 a traverse 31 is provided, each fixedly mounted on a centrally mounted flat bar or rod 32 which is disposed edgewise and passes through from front to back. The bar 32 which passes under the bearer member 10 is disposed so that it cannot be longitudinally displaced, in a vertical slit 33 in a guide pin 36, which pin is inserted in a boring 34 in the bearer member 10 and in the guiding lug 18, and prevents any displacement of the bar 32 in its longitudinal or transverse direction. On each of the ends of the bar 32 projecting over the traverses 31 is fixedly mounted a downwardly directed centring pin 36. These centring pins 36 fit into the pin apertures in the moulding boxes 17. Both ends of the traverses 31 are bifurcated and in each of these bifurcations 37 an axial pin 38 is held mounted on the associated grab lever 21 and projecting laterally from it. When the grab appliance is closed, that is to say when, as the lifting rod 9 sinks with the bearer member 10, the grab levers 21 located opposite each other are swung towards each other to seize a moulding box 17, the traverses held on the axial pins 38 in the grab levers 21 are lowered. As a result the centring pins 36 on the bar 32, which bar is fixedly connected to the traverses 31 and is downwardly displaced in the slit 33 in the guide pin 35, are inserted in the pin apertures of the moulding box 17 to be seized, and thus centre the moulding box 17. After the moulding box 17 is set down on the moulding plate 30 which lies on the table 2 of the moulding machine, that is to say when the centring pins 39 of the moulding plate 30 hold the moulding box 17 centred, then, when the grab appliance is opened, the centring pins 36 on the bar 32 are withdrawn from the pin apertures of the moulding box 17.

To lift the moulding box 17 from the delivery appliance 1, the swinging arm 5 is turned in the direction of the delivery appliance 1, and directed against the end thereof so that column 6 moves along the circular path A about the end of delivery conveyor 1. The jib 7 is also turned in the direction of the delivery appliance 1 and overlaps the swinging arm 5. After the moulding box 17 is lifted from the delivery appliance 1 whose height is the same as the height of tables 2 with plates 30, by means of the lifting rods 9 and the bearers 10 and the grab appliances associated with them, the swinging arm 5 and the column 6 together with the jib 7 are turned until the swinging arm is perpendicular to the direction of the delivery appliance 1 and the jib 7 lies in the extension of the swinging arm 5, whereupon the lifted moulding boxes 17 are suspended exactly above the two tables 2 of the moulding machine. The sequence of movements of the swinging arm 5 and the jib 7 must proceed in such manner that the least possible space is required, and in particular, so that no demands are made on the space in front of the moulding machine. This makes it necessary that the jib 7, with the moulding boxes 17 held by the grab appliances, must be passed as closely as possible in front of the column 3 of the moulding machine, as is shown in Figure 4, by means of an arc in dotted line. To effect this, the column 6 with the jib 7 in the swinging arm 5 is turned through about 60°, as is shown in Figures 3 and 4 in dotted line, whereupon with a simultaneous further rotation of the column 6 with the jib 7 in the swinging arm 5, this swinging arm is itself rotated through 90°. This sequence of movements is achieved in the following manner:

In that end of the swinging arm 5 which is mounted upon the axial pin 4 a cylindrical chamber 41, closed at the top and the bottom, is provided, the axial pin 4 being within the cylinder. A segment 42 having an angle at the centre of 90° is mounted in the swinging arm 5 and in close contact with the axial pin 4. A piston 43 mounted on the axial pin 4 is formed as a segment of a cylinder having an angle at the centre of 180° and presses against the wall of the cylindrical chamber 41. The swinging arm 5 may thus be turned through 90° upon the axial pin 4. At the other end of the swinging arm 5 there is similarly provided a cylindrical chamber 44, closed at the top and the bottom, through which passes the column 6, and limited by a segment 45 mounted in the swinging arm 5 and in close contact with the column 6, which segment has an angle at the centre of 90°. This cylindrical chamber 44 contains a piston 46 which is mounted on the column 6, is formed as a segment of a cylinder having an angle at the centre of 90° and presses against the wall of the cylindrical chamber 44. The column 6 may thus be turned through 180° in the swinging arm 5. On the swinging arm 5 an electric motor 47 is mounted, and an oil pump 48 driven by the motor. An oil container 49 is provided in the swinging arm 5. In the segment 42 two oil pipes 50 and 51 are provided, through which oil under pressure may be passed to both sides of the piston 43 into the cylindrical chamber 41, or may be led off from this chamber. Similarly two oil pipes 52 and 53 are provided in the segment 45, through which pipes, oil under pressure may be passed to both sides of the piston 46 into the cylindrical chamber 44, or led off therefrom.

The oil pipes 50, 51, 52 and 53 are adapted to be connected by means of a reverse cock, not illustrated in the drawing, on one side to the pressure pipe of the oil pump 48, or to an oil return pipe leading to the oil container 49 from which the oil pump 48 sucks oil, in such manner that either the oil pipes 50 and 52 are connected to the pressure pipe of the oil pump 48, and the oil pipes 51 and 52 are connected to the oil return pipe, or conversely. To the lower end of the column 6, which end projects through the swinging arm 5, is affixed a disc or cam 54 which acts upon a roller 55 mounted on one end of a steering piston 56. This steering piston 56 is adapted to be displaced in a boring 57 in the swinging arm 5. By means of a compression spring 58 inserted in the boring 57 the steering piston 56 is pressed outwardly and the roller 55 mounted on it is pressed against the cam 54. The steering piston 56 is provided at its central portion with a recess 59. The pressure pipe 60 from the oil pump 48 leads into the chamber formed by the recess 59, and from this chamber a pressure pipe 61 leads to the aforementioned reverse cock, through which it is adapted to be connected according to choice to the oil pipe 52 or 53 in the segment 45. A further pressure pipe 62 connects the boring 57 to the aforementioned reverse cock, through which it may be connected, at choice, to the oil pipe 50 or 51 in the segment 42.

When the apparatus described is in the position where it is ready to lift the moulding box 17 from the delivery appliance 1, the cylindrical chambers 41 and 44 and the pistons 43 and 46 are in the relative position one to another illustrated in section in Figure 3. The steering piston 56 is pressed by the cam 54 into its inward end position in the boring in the swinging arm 5. By the sinking of the two lifting rods 9 with their bearer members 10, two empty moulding boxes 17 on the delivery appliance 1 are seized by the grab appliance and raised by raising the two lifting rods 9. If the electric motor is now started, the oil pump 48 conveys oil under pressure through the pressure pipe 60 into the chamber in the boring 57, which chamber is formed by the recess 59 in the steering piston 56, and this oil under pressure flows through the pressure pipe 61 to the reverse cock and from there to the oil pipe 52 in the segment 45. As a result, the piston 46 is turned, and with it the column 6 in the swinging arm 5, whereupon the oil forced out of the cylindrical chamber 44, on the other side of the piston 46, flows off through the oil pipe 53 of the segment 45, and through the reverse cock into the oil container 49. The pressure pipe 62 is still closed by the steering piston 56, so that as yet no oil under pressure is passed to the oil pipe 50 in the segment 42. The cam 54 also rotates with the column 6 and this allows the steering piston 56 to move gradually outwardly under the compression spring 58. When the column 6 has rotated through an angle of about 60°, the steering piston 56 has moved so far outwardly that it frees the pressure pipe 62. As a result, oil under pressure is passed through this pressure pipe 62 and through the reverse cock to the oil pipe 50 in the segment 42, and the swinging arm 5 is rotated clockwise on the axial pin 4, so that the column 6 in the swinging arm 5 is rotated further. The knee formed during the first phase of motion by the swinging arm 5 and the jib 7, extends gradually with the result that the jib 7, with the moulding box 17 lifted from the delivery appliance, are moved past, and close in front of column 3 of the moulding machine, until, at the end of this second phase of motion, the swinging arm 5 is turned through 90° and the jib 7 is in line with this swinging arm. The moulding boxes 17 hanging in the grab appliances of the jib 7 are then exactly above the tables 2 of the moulding machine, and may now be set down, in the manner described, upon the moulding plates 30 mounted upon the tables, and are simultaneously centred. After the moulding boxes 17 are set down, the aforementioned reverse cock is reversed and the swinging arm 5 and the jib 7 are returned in the opposite direction to the starting position above the delivery appliance 1. To switch the electric motors 16 and 17 on or off, automatically operating switches may be provided.

Instead of oil, another pressure agent, for example compressed air, may be used to turn the column 6 in the swinging arm 5, and to turn the swinging arm 5. Advantageously the compressed air may be taken from compressed air plant already in use, in the moulding operation.

The hydraulic or pneumatic driving appliance for turning the column 6 in the swinging arm 5 may be dispensed with, and the jib 7 may be guided in a guide rail by means of guiding devices provided upon the jib. In the same way, the swinging arm 5, instead of being provided with a hydraulic or pneumatic driving appliance, may be mechanically driven, as for example by cogwheels.

I claim:

1. Apparatus for handling boxes, comprising, in combination, conveyor means for boxes having an end portion to which boxes are conveyed; swingable means including a supporting arm means supported at one end for turning movement about a first axis located in the region of said conveyor means, and a jib arm means supported on the other end of said support arm means for turning movement about a second axis parallel to said first axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support located in the region of said jib arm means in said expanded position of said swingable means; means mounted on said jib arm means for grabbing in said folded position of said swingable means boxes located on said end portion of said conveyor means and for depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means controlling and actuating said first and second actuating means in a selected sequence so that said support arm means and said jib arm means sweep over a selected small area during movement of said swingable element.

2. Apparatus for handling boxes, comprising, in combination, conveyor means for boxes having an end portion to which boxes are conveyed; swingable means including a supporting arm means supported at one end for turning movement about a first axis located in the region of said conveyor means, and a jib arm means supported on the other end of said support arm means for turning movement about a second axis parallel to said first axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support located in the region of said jib arm means in said expanded position of said swingable means; means mounted on said jib arm means for grabbing in said folded position of said swingable means boxes located on said end portion of said conveyor means and for depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means controlling and actuating said first and second actuating means in a selected sequence so that said support arm means first turns through a selected angle and then said support arm means and said jib arm means turn simultaneously in opposite directions about selected angles so that said support arm means and said jib arm means sweep over a selected small area during movement of said swingable element.

3. Apparatus for handling boxes, comprising, in combination, conveyor means for boxes having an end portion to which boxes are conveyed; swingable means including a supporting arm means located below said conveyor means and supported at one end for turning movement about a first axis passing through said conveyor means, and a jib arm means located above said conveyor means and supported on the other end of said support arm means for turning movement about a second axis parallel to said first axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support located in the region of said jib arm means in said expanded position of said swingable means; means mounted on said jib arm means for grabbing in said folded position of said swingable means boxes located on said end portion of said conveyor means and for depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means controlling and actuating said first and second actuating means in a selected sequence so that said support arm means first turns through a selected angle and then said support arm means and said jib arm means turn simultaneously in opposite direction about selected angles so that said support arm means and said jib arm means sweep over a selected small area during movement of said swingable element.

4. Apparatus for handling boxes, comprising, in combination, horizontal conveyor means for boxes having an end portion to which boxes are conveyed; swingable means including a horizontal supporting arm means located below said conveyor means and supported at one end for turning movement about a first vertical axis passing through said conveyor means, a horizontal jib arm means located above said conveyor means and a vertical column supported on the other end of said support arm means for turning movement about a second vertical axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support table located in the region of said jib arm means in said expanded position of said swingable means; lifting and lowering means mounted on said jib arm means for grabbing and lifting in said folded position of said swingable means boxes located on said end portion of said conveyor means and for lowering and depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means controlling and actuating said first and second actuating means in a selected sequence so that said support arm means first turns through a selected angle and then said support arm means and said jib arm means turn simultaneously in opposite direction about selected angles so that said support arm means and said jib arm means sweep over a selected small area during movement of said swingable element.

5. Apparatus for handling boxes, comprising, in combination, conveyor means for boxes having an end portion to which boxes are conveyed; swingable means including a supporting arm means supported at one end for turning movement about a first axis located in the region of said conveyor means, and a jib arm means supported on the other end of said support arm means for turning movement about a second axis parallel to said first axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support located in the region of said jib arm means in said expanded position of said swingable means; means mounted on said jib arm means for grabbing in said folded position of said swingable means boxes located on said end portion of said conveyor means and for depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means including cam means connected to said jib arm means for rotation therewith and cam follower means cooperating with said cam means and operatively connected to said first and second actuating means and controlling and actuating said first and second actuating means in a selected sequence so that said support arm means and said jib arm means sweep over a selected small area during movement of said swingable element.

6. Apparatus for handling boxes, comprising, in combination, conveyor means for boxes having an end portion to which boxes are conveyed; swingable means including a supporting arm means located below said conveyor means and supported at one end for turning movement about a first axis passing through said conveyor means, and a jib arm means located above said conveyor means and supported on the other end of said support arm means for turning movement about a second axis parallel to said first axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support located in the region of said jib arm means in said expanded position of said swingable means; means mounted on said jib arm means for grabbing in said folded position of said swingable means boxes located on said end portion of said conveyor means and for depositing in said expanded position of said swingable means the boxes on said support; and operating means for moving said swingable means between said folded and expanded positions, and including first actuating means operatively connected to said support arm means for turning the same about said first axis, second actuating means connected to said jib arm means for turning the same about said second axis, and control means including cam means connected to said jib arm means for rotation therewith and cam follower means cooperating with said cam means and operatively connected to said first and second actuating means and controlling and actuating said first and second actuating means in a selected sequence so that said support arm means first turns through a selected angle and then said support arm means and said jib arm means turn simultaneously in opposite direction about selected angles so that said support arm means and said jib arm means sweep over a selected small area during movement of said swingable element.

7. Apparatus for handling boxes, comprising, in combination, horizontal conveyor means for boxes having an end portion to which boxes are conveyed; swingable means including a horizontal supporting arm means located below said conveyor means and supported at one end for turning movement about a first vertical axis passing through said conveyor means, a horizontal jib arm means located above said conveyor means and a vertical column supported on the other end of said support arm means for turning movement about a second vertical axis, said swingable means being movable between a folded position in which said supporting arm means and said jib arm means are folded over each other along said conveyor means, and an expanded position in which jib arm means projects from said other end of said support arm means and in which said support arm means extends in a direction transverse to said conveyor means; a support table located in the region of said jib arm means in said expanded position of said swingable means; lifting and lowering means mounted on said jib arm means for grabbing and lifting in said folded position of said swingable means boxes located on said end portion of said conveyor means and for lowering and depositing in said expanded position of said swingable means the boxes on said support; and operating means for moving said swingable means between said folded and expanded positions, and including first hydraulic actuating means operatively connected to said support arm means for turning the same about said first axis, second hydraulic actuating means connected to said jib arm means for turning the same about said second axis, and control means including cam means connected to said column and therethrough to said jib arm means for rotation therewith, cam follower means cooperating with said cam means and being mounted on said support arm means, and control valve means hydraulically connected to said first and second hydraulic actuating means and operatively connected to said cam follower means so that said first and second hydraulic actuating means are operated in a selected sequence for first turning said support arm means through a selected angle and for then turning said support arm means and said jib arm means simultaneously in opposite directions through selected angles to that said support arm means first turns through a selected angle and then said support arm means and said jib arm means turn simultaneously in opposite directions about selected angles so that said support arm means and said jib arm means sweep over a selected small area during movement of said swingable element.

8. An apparatus as set forth in claim 7 wherein said lifting and lowering means comprise a rack bar mounted on said jib arm means for vertical movement, a cog wheel meshing with said rack bar, and reversible electric motor mounted on said jib arm means for driving said cog wheel.

9. An apparatus as set forth in claim 7 wherein said hydraulic actuating means are mounted on said support arm means; and including first stop means limiting turning movement of said support arm means to a selected angle, and second stop means limiting turning movement of said jib arm means to another selected angle.

10. An apparatus as set forth in claim 7 wherein said first hydraulic actuating means includes a cylinder member having a segment shaped stop projection and being fixed to said support arm means, and a stationary segment-shaped piston located in said cylinder and forming with said segment-shaped stop portion an arcuate pressure chamber so that turning movement of said support arm means is limited to a selected angle.

11. An apparatus as set forth in claim 7 wherein said second hydraulic actuating means includes a cylinder having segment-shaped stop projection and being fixed to said support arm means, and a segment-shaped piston fixedly connected to said column and located in said cylinder and forming with said segment-shaped stop portion an arcuate pressure chamber so that turning movement of said jib arm means is limited to a selected angle.

References Cited in the file of this patent

UNITED STATES PATENTS

| | | |
|---|---|---|
| 760,138 | Morse | May 17, 1904 |
| 1,811,832 | Mayers | June 23, 1931 |
| 1,883,013 | Shinn | Oct. 18, 1932 |
| 2,340,812 | Koob | Feb. 1, 1944 |
| 2,834,489 | Davis | May 13, 1958 |

FOREIGN PATENTS

| | | |
|---|---|---|
| 1,094,823 | France | May 24, 1955 |